(12) United States Patent
Lohrentz et al.

(10) Patent No.: US 9,386,746 B2
(45) Date of Patent: Jul. 12, 2016

(54) WIRE HARNESS INTEGRATED WITH ROTATIONAL MOLD

(71) Applicant: AGCO Corporation, Hesston, KS (US)

(72) Inventors: Randy Lohrentz, Buhler, KS (US); Timothy Dan Buhler, Newton, KS (US); Steven R. Tippery, Newton, KS (US)

(73) Assignee: AGCO Corporation, Duluth, GA (US)

( * ) Notice: Subject to any disclaimer, the term of this patent is extended or adjusted under 35 U.S.C. 154(b) by 1 day.

(21) Appl. No.: 14/483,623

(22) Filed: Sep. 11, 2014

(65) Prior Publication Data

US 2015/0068180 A1 Mar. 12, 2015

Related U.S. Application Data

(60) Provisional application No. 61/876,353, filed on Sep. 11, 2013.

(51) Int. Cl.
*A01D 45/02* (2006.01)
*B29C 41/04* (2006.01)
*B29L 31/00* (2006.01)

(52) U.S. Cl.
CPC .............. *A01D 45/021* (2013.01); *B29C 41/04* (2013.01); *B29L 2031/70* (2013.01)

(58) Field of Classification Search
CPC ..... A01B 71/08; A01D 34/006; A01D 41/14; A01D 41/16; A01D 41/127; A01D 41/00; A01D 65/00; A01D 45/021; A01D 45/00; A01D 45/02; E02F 3/3604; B29C 41/04; B29L 2031/70
USPC ...................... 56/14.9, 119, 2, 15.6, 126, 314
See application file for complete search history.

(56) References Cited

U.S. PATENT DOCUMENTS

| | | | | |
|---|---|---|---|---|
| 4,502,270 A * | 3/1985 | Shupert | ................ | A01D 45/021 56/119 |
| 5,332,863 A * | 7/1994 | Emmert | ................... | E04C 2/36 174/481 |
| 6,247,297 B1 * | 6/2001 | Becker | ................. | A01D 45/021 56/119 |
| 6,519,923 B1 * | 2/2003 | Cooksey | ................ | A01B 71/08 56/14.9 |

* cited by examiner

*Primary Examiner* — Robert Pezzuto

(57) ABSTRACT

In one embodiment, a method comprising rotationally molding a snout of a corn row divider assembly, the snout comprising a double-walled structure; rotationally molding a first conduit into a surface of the double-walled structure, the first conduit extending from an aft end of the snout to a location proximal to the fore end of the snout; attaching a sensor to the snout at a location proximal to the fore end of the snout; inserting a first wire harness into the first conduit, the first wire harness extending between the aft end of the snout and the location proximal to the fore end; and connecting the first wire harness to the sensor.

17 Claims, 9 Drawing Sheets

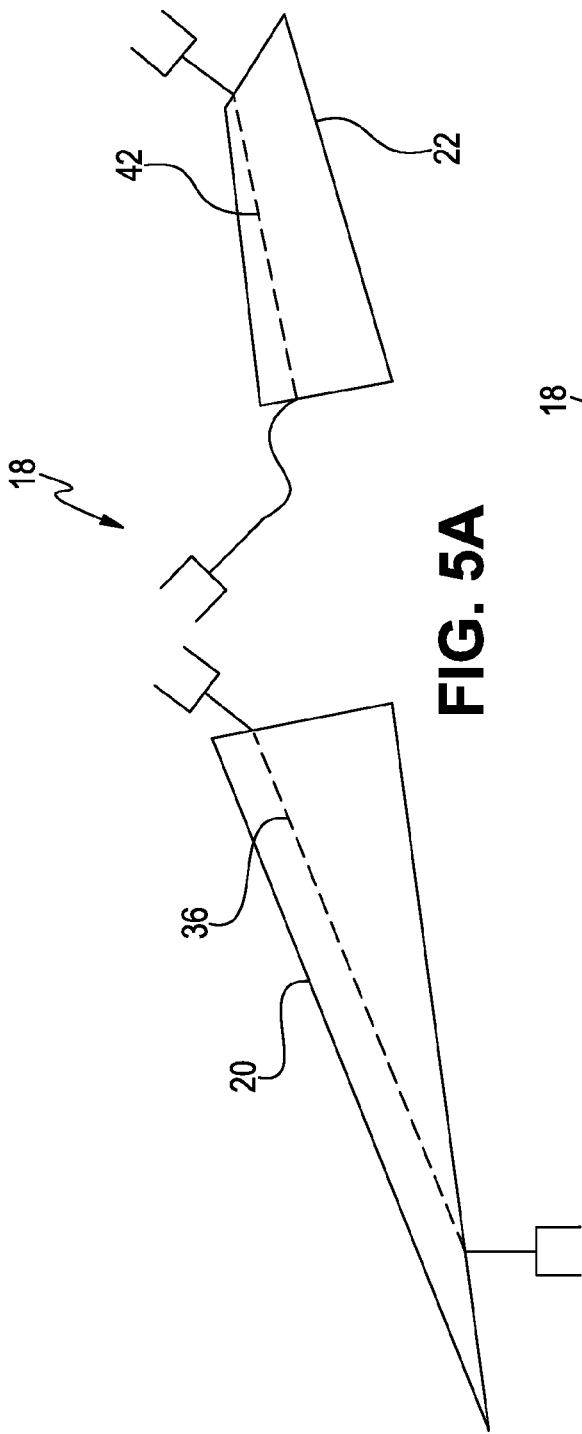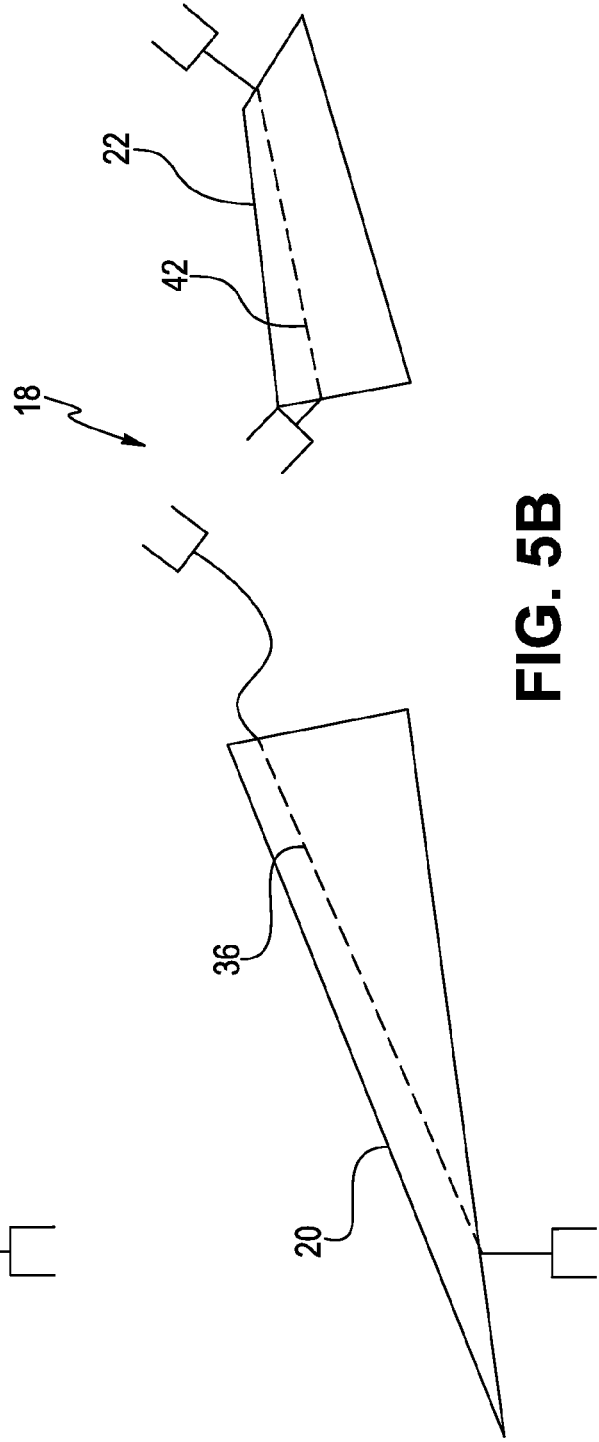

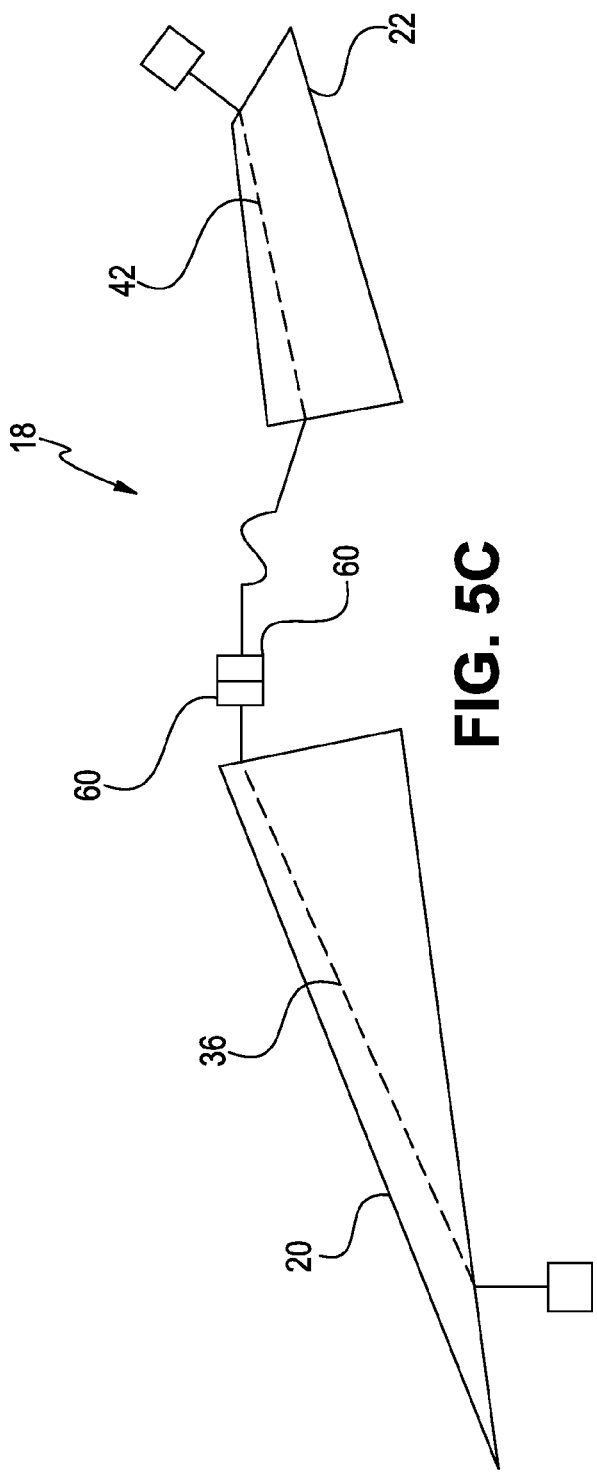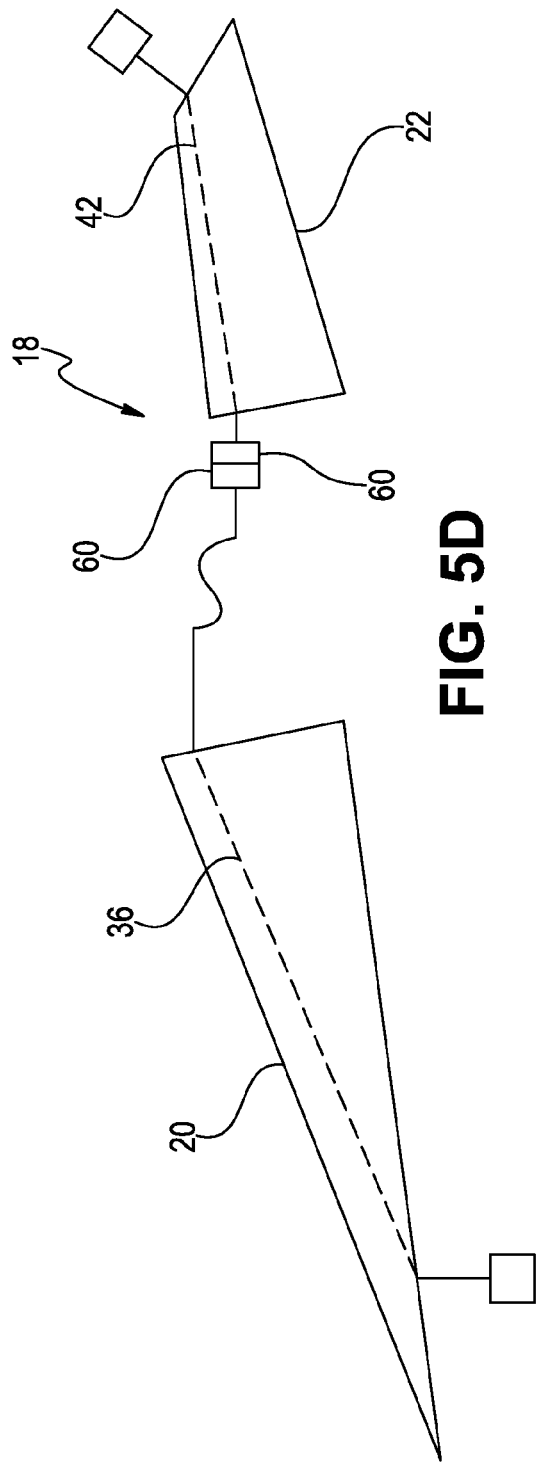

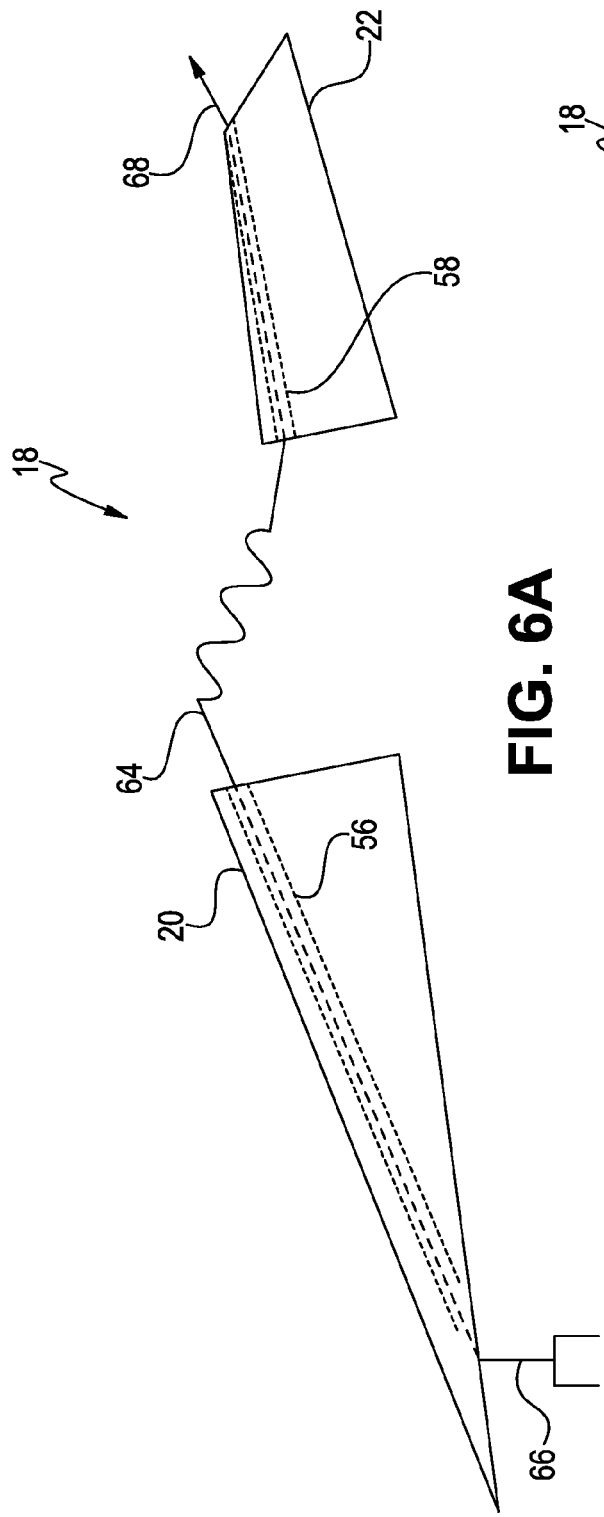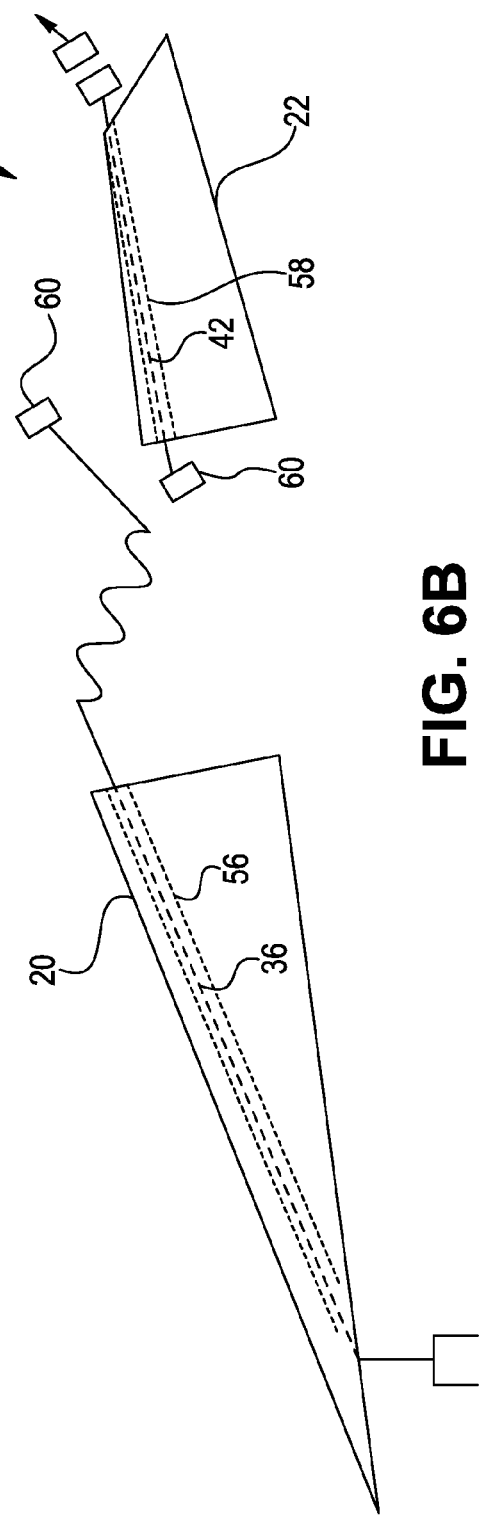

WIRE HARNESS INTEGRATED WITH ROTATIONAL MOLD

CROSS REFERENCE TO RELATED APPLICATION

This application claims the benefit of U.S. Provisional Application No. 61/876,353, filed Sep. 11, 2013, which is hereby incorporated by reference in its entirety.

TECHNICAL FIELD

The present disclosure is generally related to headers for agricultural machines and, more particularly, is related to wire harnesses for corn headers.

BACKGROUND

Agricultural harvesters such as combines are typically equipped with a harvesting header. For instance, corn headers are specifically designed to pick up corn, and vary in size (e.g., two row units, twelve row units, etc.). As the harvester moves through the field, each row unit passes between rows of corn. Corn header row units typically use gathering chains or other mechanisms to convey crop material and ears rearward toward a cross auger. A set of driven stalk rolls, which may rotate based on the speed of the harvester, grabs the corn stalks and forces them downward between stripper plates. The ears of corn are snapped free of the stalk and the cross auger passes the ears to the feeder housing of the harvester. When the harvesting job is completed, the corn header is transported based on a fore and aft length that may be limited by regulations, and stored. Each stalk roll resides beneath a corn row divider assembly that includes a snout and gatherer hood, which is typically comprised of a rotational molded double wall design. Sensors for ground sensing and row guidance on a corn header are located close to the point of the snout on the snout and gatherer assembly. During the assembly process, wiring in the form of generally two or four wire, fourteen-sixteen (14-16) gauge wiring harnesses are fished through the gatherer hood and snout assembly to electrically couple the sensors to a control panel located on the header (which may include a connector) which is further coupled to the combine harvester electrical mechanisms.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 5A-5E are schematic diagrams showing conceptually in side elevation, fragmentary views various examples for coupling an integrated wire harness assembly corresponding to the embodiment of FIG. 3.

FIGS. 6A-6B are schematic diagrams showing conceptually in side elevation, fragmentary views various examples for coupling an integrated wire harness assembly corresponding to the embodiment of FIG. 4.

DESCRIPTION OF EXAMPLE EMBODIMENTS

Overview

Figure 1:
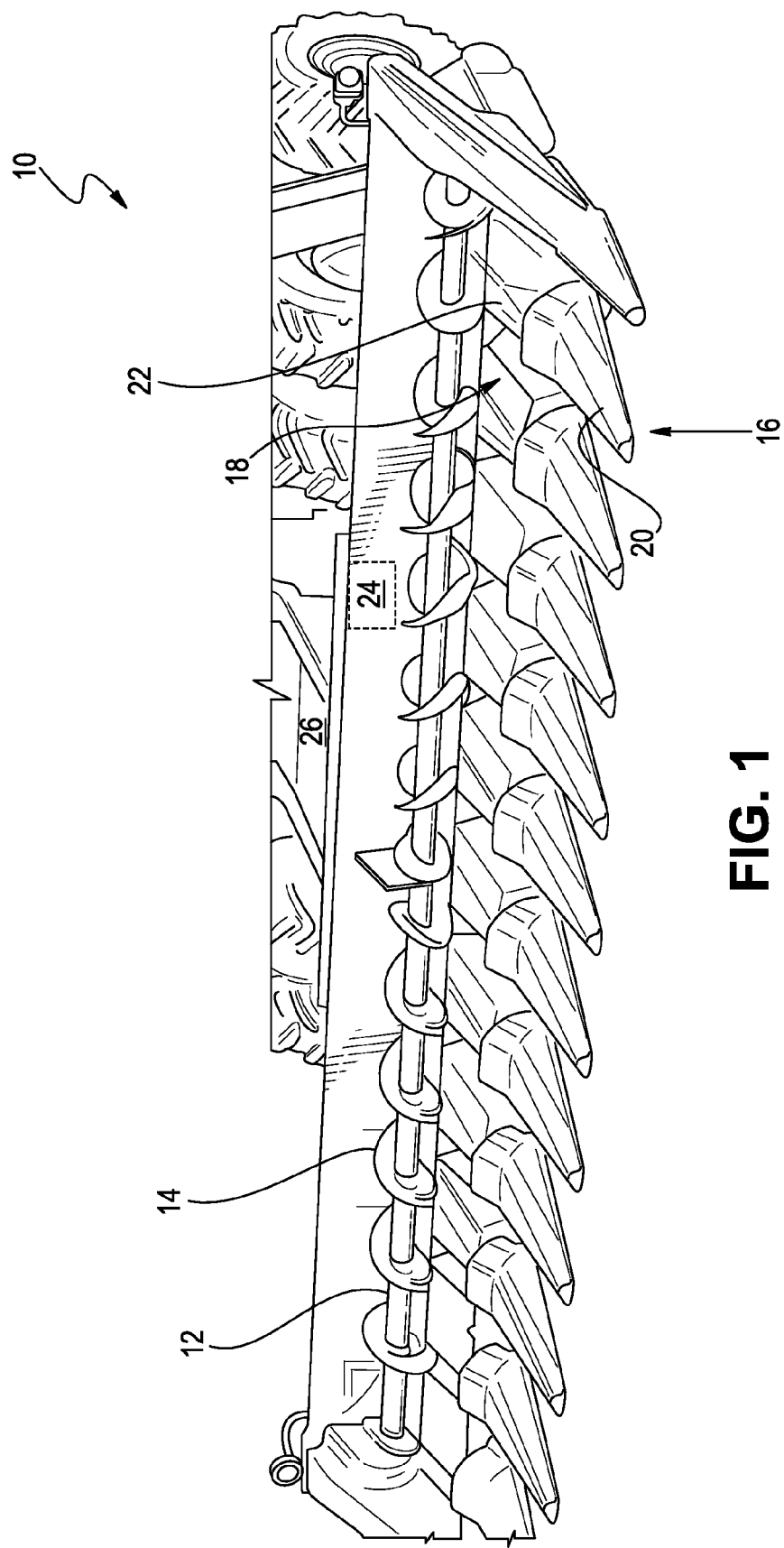
FIG. 1 is a schematic diagram showing a front perspective view of an example corn header in which an embodiment of an integrated wire harness assembly is installed.

In one embodiment, a method comprising rotationally molding a snout of a corn row divider assembly, the snout comprising a double-walled structure; rotationally molding a first conduit into a surface of the double-walled structure, the first conduit extending from an aft end of the snout to a location proximal to the fore end of the snout; attaching a sensor to the snout at a location proximal to the fore end of the snout; inserting a first wire harness into the first conduit, the first wire harness extending between the aft end of the snout and the location proximal to the fore end; and connecting the first wire harness to the sensor.

DETAILED DESCRIPTION

Certain embodiments of an integrated wire harness assembly for a corn header and associated corn row divider assembly are disclosed that significantly improve the assembly process, which may reduce the costs of production. In one embodiment, a wire harness is integrated into a rotational molded part or parts, such as a snout and gatherer hood of a corn row divider assembly, at the time of molding the part(s). In some embodiments, a conduit is integrated into a rotational molded part or parts. In this latter embodiment, the wire harness can be easily routed into the conduit during the assembly process.

Digressing briefly, sensors for ground sensing or row guidance on corn headers are located close to the point of the snout on the snout and gatherer assembly. For instance, a wire harness is routed from the main part of the header out to the point of the snout to enable the sensor. However, the wire harness is vulnerable to damage from moving parts and flying debris. Most snout and gatherer plastic is of a rotational molded, double-wall design. One option for harness routing is to attach the harness to the underside of the plastic and another option is to fish the harness through the parts between the double walls. Both of these options are labor intensive, which increases the cost of production. By integrating the wire harness assembly (e.g., the wire harness or the conduit) into the rotational molded parts at the time of molding the parts, the cost of labor associated with attaching the harness to the corn row divider assembly structures or the job of fishing the harness through the parts amidst the various bends and/or integrated structures may be reduced.

Having summarized certain features of an integrated wire harness assembly of the present disclosure, reference will now be made in detail to the description of the disclosure as illustrated in the drawings. While the disclosure is described in connection with these drawings, there is no intent to limit it to the embodiment or embodiments disclosed herein. For instance, though described in association with a corn row header with a double walled snout and gatherer assembly, other structures that involve labor intensive assemblies of a wire harness may benefit from the use of certain embodiments of an integrated wire harness assembly, and hence are contemplated to be within the scope of the disclosure. Further, although the description identifies or describes specifics of one or more embodiments, such specifics are not necessarily part of every embodiment. On the contrary, the intent is to cover all alternatives, modifications and equivalents included within the spirit and scope of the disclosure as defined by the appended claims. Further, it should be appreciated in the context of the present disclosure that the claims are not necessarily limited to the particular embodiments set out in the description.

Referring now to FIG. 1, shown is a schematic diagram showing a front perspective view of an example corn header 10 in which an embodiment of an integrated wire harness assembly may be deployed. The corn header 10 may be coupled to the front of an agricultural harvester, such as a combine harvester, as is known to those having ordinary skill in the art. The corn header 10 comprises a frame and a cross auger 12 with spiral flighting 14 for sweeping the ears of corn toward the center of the header 10. Large cross augers 12 may also have paddles, fingers, or some other structures to facilitate the delivery of the crop rearward to a feeder housing of the combine harvester. The header 10 has a plurality of forward-extending corn row divider assemblies 16, which provide a covering for underlying plural row units. The row units and the cross auger 12 define a feeder plane therebetween where useable parts of stalk crops are conveyed rearward from the row units to the cross auger 12. One having ordinary skill in the art should appreciate in the context of the present disclosure that the number of corn row divider assemblies 16 may differ among different types of corn headers, and that other configurations of corn headers with or without a different quantity of corn row divider assemblies are contemplated to be within the scope of the disclosure. Each corn row divider assembly 16 comprises a snout and gatherer assembly 18. The snout and gatherer assembly 18 incorporate an embodiment of an integrated wire harness assembly, as described below, and further comprise a fore and aft snout 20 and gatherer hood 22, respectively, that are hingeably coupled. In one embodiment, the snout 20 is longer than the gatherer hood 22, though not limited as such. As should be appreciated by one having ordinary skill in the art, each corn row divider assembly 16 covers one stalk roll from each adjacent row unit, and further covers associated structures, such as the pairs of gathering chains (or other conveying mechanisms), etc. Also shown, in phantom, is a control panel 24, which may be disposed at the rear side of the corn header 10 to couple wiring/hoses/tubing connections from the combine harvester 26 (partially shown) to wire harnesses, such as wire harnesses for the integrated wire harness assemblies, and tubing of the corn header 10. The control panel 24 may be a connector or a housing with one or more connectors disposed therein. In some embodiments, the control panel 24 may be a self-contained panel without coupling to wiring and/or tubing from the combine harvester 26 (or other machine to which a header is attached).

Figure 2:
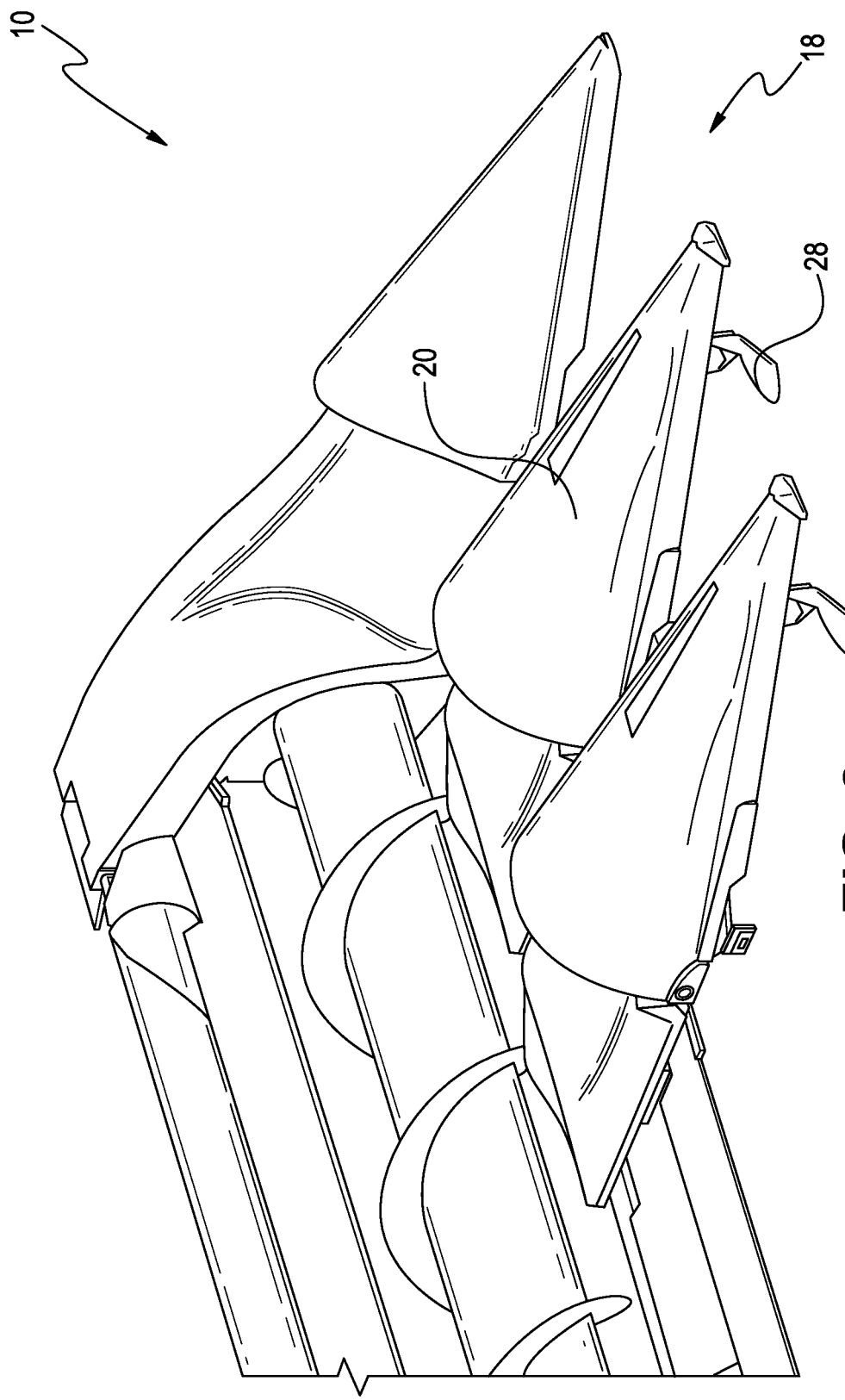
FIG. 2 is a schematic diagram showing a front perspective, close-up view of a snout and gatherer assembly for a portion of a corn header in which an embodiment of an integrated wire harness assembly is used.

Turning attention to FIG. 2, shown is a portion of the corn header 10 in fragmentary view, where two snout and gatherer assemblies 18 are depicted with a respective sensor 28 attached thereto. In the depicted example, the sensor 28 is located proximally to a fore end of the snout 20 and an underside of the snout 20. In some embodiments, the sensor 28 may be positioned elsewhere. The sensor 28 may be configured as a ground sensor (e.g., if a sensor 28 bumps the ground, it is calibrated to signal to an actuator to raise the corn header 10) or a row guidance sensor. In some embodiments, the sensor 28 may sense tilt of the corn header 10, enabling adjustments in one or more operations. The corn header 10 may have a plurality of sensors 28. For instance, the corn header may have four (4) sensors 28, though other quantities may be used depending on the design of the corn header 10 among other factors. In some embodiments, using the prior example, the corn header 10 may have three (3) sensors 28 for sensing ground level/tilt and one (1) sensor 28 for sensing row guidance. Other configurations may be used, and hence are contemplated to be within the scope of the disclosure. Wire harnesses are used to couple (e.g., electrically) the sensors 28 to the wiring from the control panel 24 (FIG. 1), as described further below.

Figure 3:
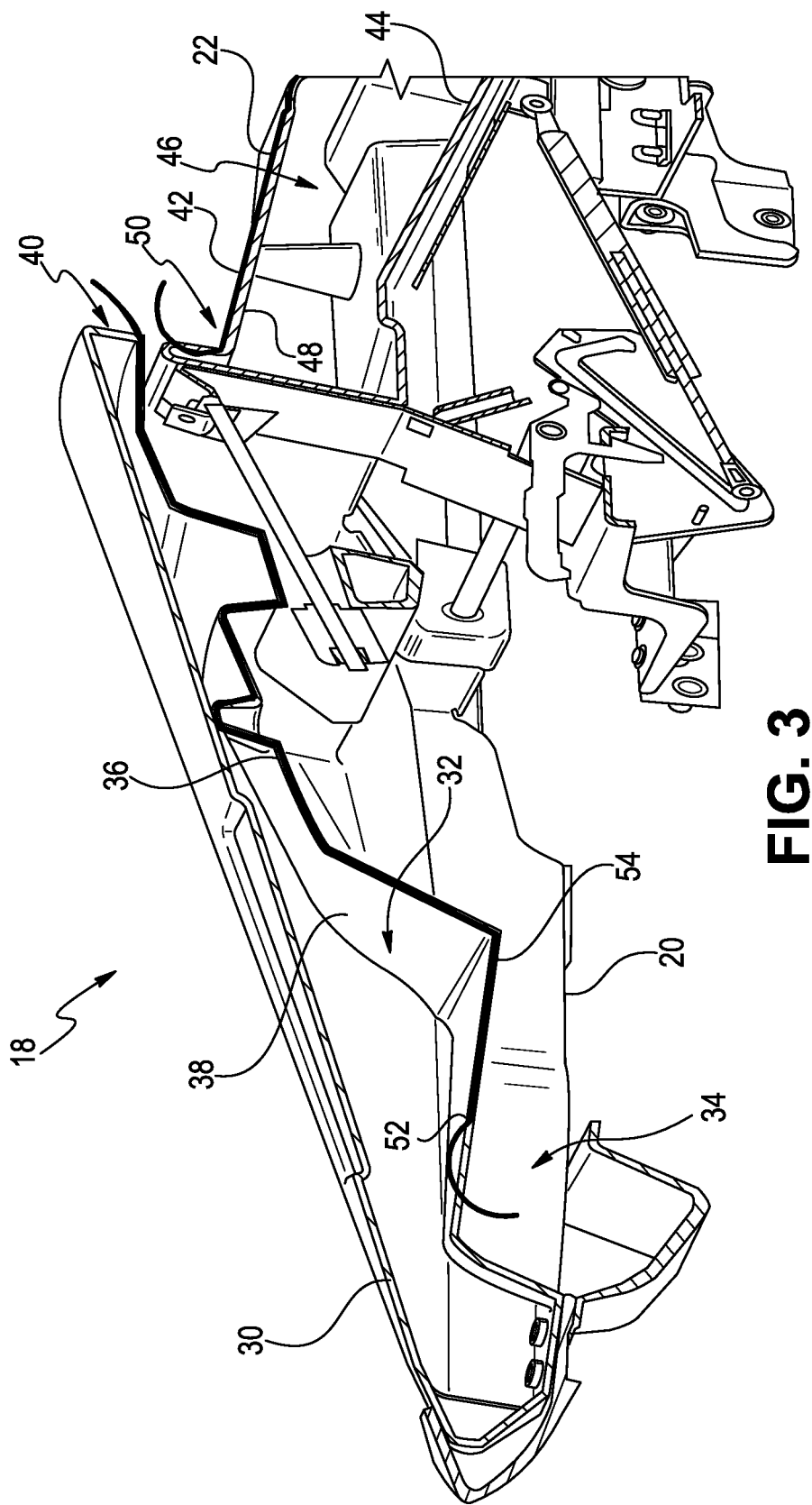
FIG. 3 is a schematic diagram showing an isometric, cutaway view of a snout and gatherer assembly exposing the double walled structure in which an embodiment of an integrated wire harness assembly is disposed as part of the rotational molding process.

Referring now to FIG. 3, shown in isometric, cut-away view, is an example snout and gatherer assembly 18 with the double wall structure exposed. In particular, the snout 20 comprises a double walled structure, such as double wall 30 that encompasses a hollow 32. As depicted in FIG. 3, the hollow 32 comprises several interior structures that conventionally make it difficult to blindly fish a wire harness therethrough to the sensor 28 (not shown in FIG. 3, but disposed at sensor location 34). Disposed in one of the interior surfaces of the double wall 30 is a wire harness 36. In particular, the wire harness 36 is depicted in this example as molded into the interior surface 38 of the lower double wall 30. The wire harness 36 is molded into the interior surface 38 as part of the rotational molding process that produces the snout 20. In some embodiments, the wire harness 36 (and other wire harnesses described herein as incorporated into the molding process) may be incorporated into the molding process as an insert. Note that in some embodiments, the same process or other types of molding processes may be used to produce the snout 20, with the integrated wire harness 36 molded into the same or other surfaces of the double wall 30. Though shown as molded centrally (longitudinally-wise) into the lower interior surface 38, in some embodiments, the wire harness 36 may be molded into the upper interior surface of the double wall 30 in a longitudinally-central, or offset, location in the molded surface. In some embodiments, the wire harness 36 may be integrated into the lower outer surface (e.g., not protruding into the hollow 32) of the double wall 30. In some embodiments, the wire harness 36 may be disposed completely between the walls of the double wall 30, with no protrusion to interrupt the shape of the interior (or exterior) surface of the double wall 30. The wire harness 36 may be of suitable gauge wire to enable sensor operation, typically fourteen-sixteen (14-16) gauge wire, with two to four wires bundled together (e.g., via tie wraps, mesh, etc.), though other quantities of wires and/or gauge wire per wire harness 36 may be used. The wire harness 36 is of suitable construction to withstand the oven temperatures during the rotational molding process. In one embodiment, the wire harness 36 extends beyond the lower surface of the snout 20 proximal to the sensor location 34, with a suitable length to facilitate wiring the sensor 28 in FIG. 2 (or in some embodiments, wiring to connector that interfaces with the sensor 28) during the assembly process. On the aft side of the snout 20, in one embodiment, the wire harness 36 also extends beyond an opening 40, facilitating the assembled connection (e.g., electrical coupling) to a wire harness 42 of the gatherer hood 22 (e.g., via one or more intermediary connectors).

Figure 4:
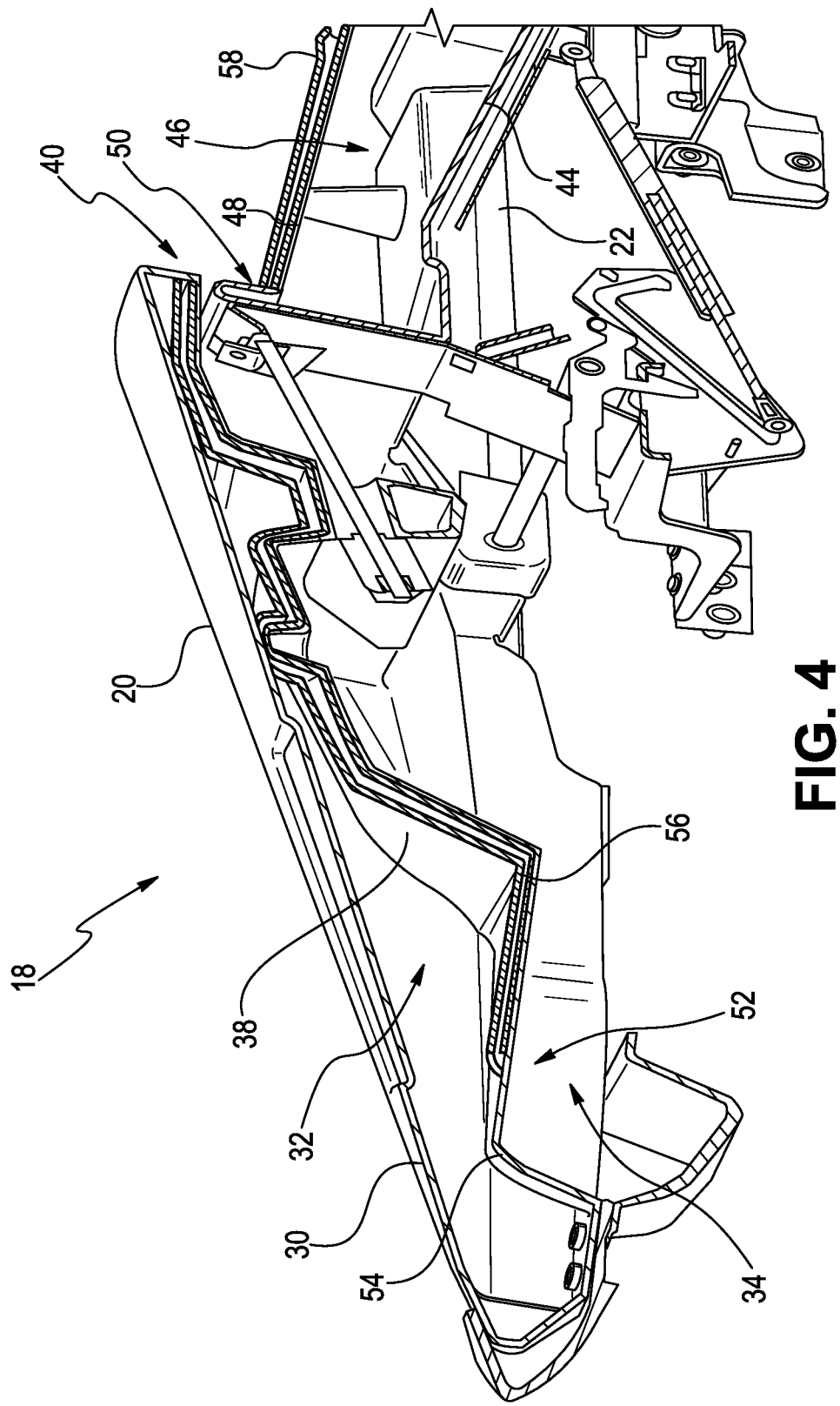
FIG. 4 is a schematic diagram showing an isometric, cutaway view of a snout and gatherer assembly exposing the double walled structure in which another embodiment of an integrated wire harness assembly is disposed as part of the rotational molding process.

Similarly, the gatherer hood 22 comprises a double wall construction, such as double wall 44, which encompasses a hollow 46. The gatherer hood 22 is a rotationally molded part, though, as is true with the snout 20, some embodiments may use other molding processes. The wire harness 42 is configured similarly in structure to wire harness 36, and is integrated through the rotational molding process (or other molding processes in some embodiments) into an interior surface 48 of the double wall 44. Though shown integrated into a top interior surface 48 of the double wall 44, in some embodiments, the wire harness 42 may be molded into other surfaces. Similar to the description above as to the integration, the wire harness 42 may be entirely integrated in between the double walls without any disruption in the shape of the double wall 44, or in some embodiments, protruding from a surface of the double wall 44 (e.g., distorting the shape). Also, the wire harness 42 may extend beyond a fore opening 50 (and aft opening, not shown in FIG. 3) to facilitate an assembled connection to connectors proximal to respective wire harness openings of the gatherer hood 22. It should be appreciated that the depicted openings for access to the wire harnesses 36 and 42 are merely illustrative, and that some embodiments may have the openings elsewhere on the snout 20 and/or gatherer hood 22. Further, it is noted that an additional opening 52 may be disposed in the lower double wall surface 54 adjacent the hollow 32 of the snout 20 to permit the wire harness 36 to be coupled Attention is now directed to FIG. 4, which illustrates in isometric view the snout and gatherer hood assembly 18 and another embodiment of an integrated wire harness assembly. In the embodiment depicted in FIG. 4, an integrated wire harness assembly comprises conduit 56 and 58 molded into a surface of the double walls 30 and 44 of the snout 20 and gatherer hood 22, respectively. For instance, during the process of rotationally molding the snout 20 and gatherer hood 22, the conduit 56 and 58 are rotationally molded into the double walls 30 and 44, respectively. Note that the molding process for the snout 20 and gatherer hood 22 may be performed at the same time, or different times, and/or based on different molding processes. In one embodiment, the conduit 56 is molded into the interior surface 38 of the double wall 30 (of the snout 20) that defines the hollow 32. Though shown protruding into the hollow 32, the conduit 56 may be contained entirely within the planes of the two walls of the double wall 30 (e.g., without interrupting the shape of the surface or lower surface 54), or in some embodiments, the conduit 56 may protrude from the lower surface 54 (extending in a direction opposite the hollow 32). In some embodiments, the conduit 56 may be molded into another location (e.g., another surface) of the double wall 30 or elsewhere and/or in a different orientation (e.g., not running along the longitudinal midline of the surface 38 or any other surface, but rather, offset from the midline, suspended from a given surface, etc.). The opening 40 may serve as the opening of the conduit 56 (e.g., to enable a wire harness to be inserted into, or pulled from, the snout 20), or the opening 40 may be located elsewhere depending on the orientation of the conduit 56 relative to the snout 20. The opening 52 may serve as the opening (e.g., to enable a wire harness to be connected to a sensor) for the conduit 56 adjacent or proximal to the sensor location 34, although the opening 52 may be located elsewhere depending on the orientation of the conduit 56 in some embodiments.

As to the gatherer hood 22, the conduit 58 is molded into the interior surface 48 (e.g., interior surface of the top side of the gatherer hood 22) of the double wall 44 that defines the hollow 46. One embodiment of an integrated wire harness assembly comprises the conduit 58 protruding into the hollow 46 from the interior surface 48. In some embodiments, the conduit 58 does not protrude (e.g., does not deform the surface of the double wall 44). In some embodiments, the conduit 56 may be molded into another location of the gatherer hood 22 (e.g., another surface, such as a lower surface of the double wall 44, etc.). The fore opening 50 of the conduit 58 serves to enable egress (or ingress) of a wire harness from or into the gatherer hood 22. An aft opening of the gatherer hood 22 (not shown) enables the insertion of, or withdrawal from, the gatherer hood 22 and connection to the control panel 24 (FIG. 1) of the header 10 (FIG. 1), or a coupling to an intermediary wire harness that is coupled to the control panel 24. Similar to the conduit 56 of the snout 20, the conduit 58 may be rotationally molded as part of the rotational molding process of the gatherer hood 22, and disposed according to other orientations and/or locations within the gatherer hood 22 that facilitate fishing the wire harness or harnesses (e.g., modular) through the snout and gatherer assembly 18 and the coupling of the control panel 24 to the sensors 28 (FIG. 2).

Figure 5E:
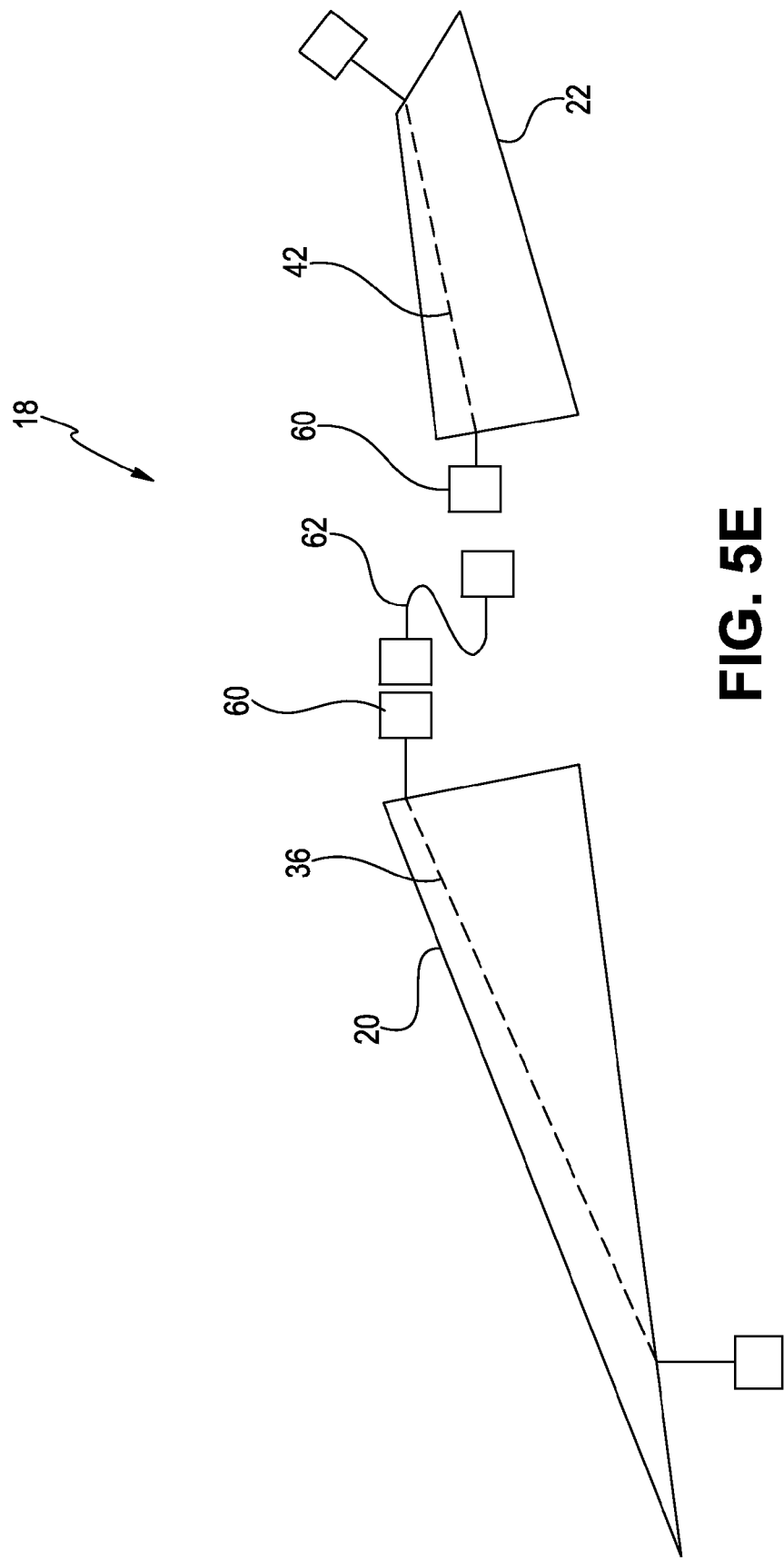

Having described some example embodiments of integrated wire harness assemblies, attention is directed to FIGS. 5A-6B, which are simplified schematic diagrams of certain wire harness coupling configurations that may be used. It should be appreciated that other configurations may be used in some embodiments, and that some embodiments may mix and match those configurations described in association with the figures, and hence are contemplated to be within the scope of the present disclosure. FIGS. 5A-5E provide several examples for embodiments of an integrated wire harness assembly comprising an integrated wire harness, which is molded into surfaces of the snout and gatherer hood assembly 18, whereas FIGS. 6A-6B provide several examples for embodiments of an integrated wire harness assembly comprising a conduit that is molded into surfaces of the snout and gatherer hood assembly 18. Referring to FIG. 5A, shown are the snout 20 and the gatherer hood 22 of the snout and gatherer hood assembly 18, with the molded wire harness 36 and wire harness 42 in the snout 20 and gatherer hood 22, respectively, and denoted with a dashed line when within the structures 20 and 22. It should be appreciated that the manner of running the wire harnesses 36 and 42 as depicted in the figures is merely illustrative, and that other configurations (e.g., with bends, in different locations, etc.) may be used in some embodiments. At the end of the wire harnesses 36 and 42 are two wires from the respective harnesses, though it should be appreciated that other quantities of wires may be used. In this example (of FIG. 5A), the wire harnesses 36 and 42 are each a modular harnesses, wherein during the assembly process, the assembler needs to connect the wire harnesses 36 and 42 together, as well as connect the wire harness 36 to a sensor at the snout 20 and the wire harness 42 to a wire harness that extends to a control panel. The coupling may involve splicing together the wires of the harnesses 36 and 42 through the use of one of a variety of known splicing connector or connectors (e.g., crimp type, etc.). In one embodiment, there is more slack in the wiring for the wire harness 42 compared to that for the wire harness 36 at the end that couples to the wire harness 42. Such a slack in the wiring enables the snout 20 and gatherer hood 22 to pivot relative to one another (e.g., when in a transport or maintenance mode) without undue stress in the wiring. It should be appreciated that the wire harness 36 at the end proximal to the sensor also may have slack, as noted by the extended length of the wiring from the snout 20, to facilitate wiring to the sensor.

Referring to FIG. 5B, the snout 20 comprises a wire harness 36 with slack in the wiring, whereas the end of the wiring of the wire harness 42 for the gatherer hood 22 that is to be connected to the wire harness 36 does not have as much slack. In other words, FIG. 5B is merely illustrating that the slack in the location where the wire harnesses 36 and 42 join may be more pronounced at either the locations corresponding to the wire harness 36 or 42. In some embodiments, the amount of slack may be the same per harness at the ends where the two harnesses 36 and 42 connect. Once again, splicing of the wires of the wire harnesses 36 and 42 may be through the use of a splice connector.

FIGS. 5C-5D are schematic diagrams of snout and gatherer hood assemblies 18, similar to those assemblies 18 shown in FIGS. 5A-5B, respectively, except where quick connect-type connectors 60 are used at the ends of the wire harnesses 36 and 42. For instance, one end of the wire harness 36 may have a male-type connector 60, and the end of the wire harness 42 that couples to the male-type connector 60 of the wire harness 36 has a female type connector 60. In some embodiments, the designated male versus female configuration may be reversed. The use of quick-connect type connectors 60 reduces the risk of human error when coupling the wire harnesses 36 and 42. It should be appreciated that in some embodiments, fewer quick connectors 60 than those shown may be used (e.g., some connections may be achieved through the use of splice-type connectors). A similar illustration of the amount of slack is depicted, with the understanding that equal amounts of slack in the respective wire harnesses 36 and 42 may be used in some embodiments.

FIG. 5E depicts an example wire harness coupling arrangement where the amount of slack of each wire harness 36 and 42 of the snout 20 and gatherer hood 22, respectively, is equal or substantially equal, and the quick connect type connectors 60 at the coupling ends of the wire harnesses 36 and 42 are used with an adapter wire harness 62, enabling a substantially equal amount of slack for each wire harness 36 and 42, though some embodiments may have unequal amounts of slack similar to hose configurations depicted in FIGS. 5A-5D.

Referring now to FIGS. 6A-6B, shown are some example wire harness coupling configurations when conduit is molded into a surface of the snout 20 and gatherer hood 22 of a snout and gatherer assembly 18. The conduit 56 of the snout 20 is denoted with a smaller-spaced dashed line, and similarly, the conduit 58 of the gatherer hood 22 is denoted with a similarly, smaller-spaced dashed line. Though shown in a given orientation, it should be appreciated that the conduit shape and/or location in these figures is merely illustrative, and that other configurations may be used in some embodiments. With reference to FIG. 6A, a single wire harness 64 is fished through the space created by the conduit 56 and 58 (e.g., which can be cylindrical, or other geometries that facilitate routing wiring through it), with one end 66 coupled to a sensor (e.g., the end of the wire harness 64 shown with two wires, but other quantities of wires may be used with or without a quick connector type connector or splice connector) and another end proximal to the control panel 24 (FIG. 1), as denoted by the arrow 68 proximal to the aft end of the gatherer hood 22. Slack in the wiring is depicted in between the snout 20 and gatherer hood 22.

With reference to FIG. 6B, the wire harness 36 is shown fished through the conduit 56 of the snout 20, with a quick connect type connector 60 coupled at the aft end of the snout 20, though other types of connectors may be used. At the fore end of the snout 20, the wire harness 36 does not comprise a quick connect type connector, though some embodiments may use a quick connect connector. The wiring of the wire harness 36 at an aft end of the snout 20 comprises slack. In short, a modular wire harness 36 is used for the snout 20 with the same or different end connections. With regard to the gatherer hood 22, the wire harness 42 is likewise modular, with quick connect type connectors 60 coupled to each end of the wire harness 42. The quick connect type connector at the aft end of the gatherer hood 22 is coupled to another quick connect type connector associated with the wire harness that runs to the control panel 24 (FIG. 1), though some embodiments may omit a connector and the wiring of the wire harness 42 is run back to the control panel 24 without an intervening connector. It should be appreciated that other types of connectors may be used in place of one or more of the connectors 60 shown in FIG. 6A and 6B in some embodiments.

Figure 7:
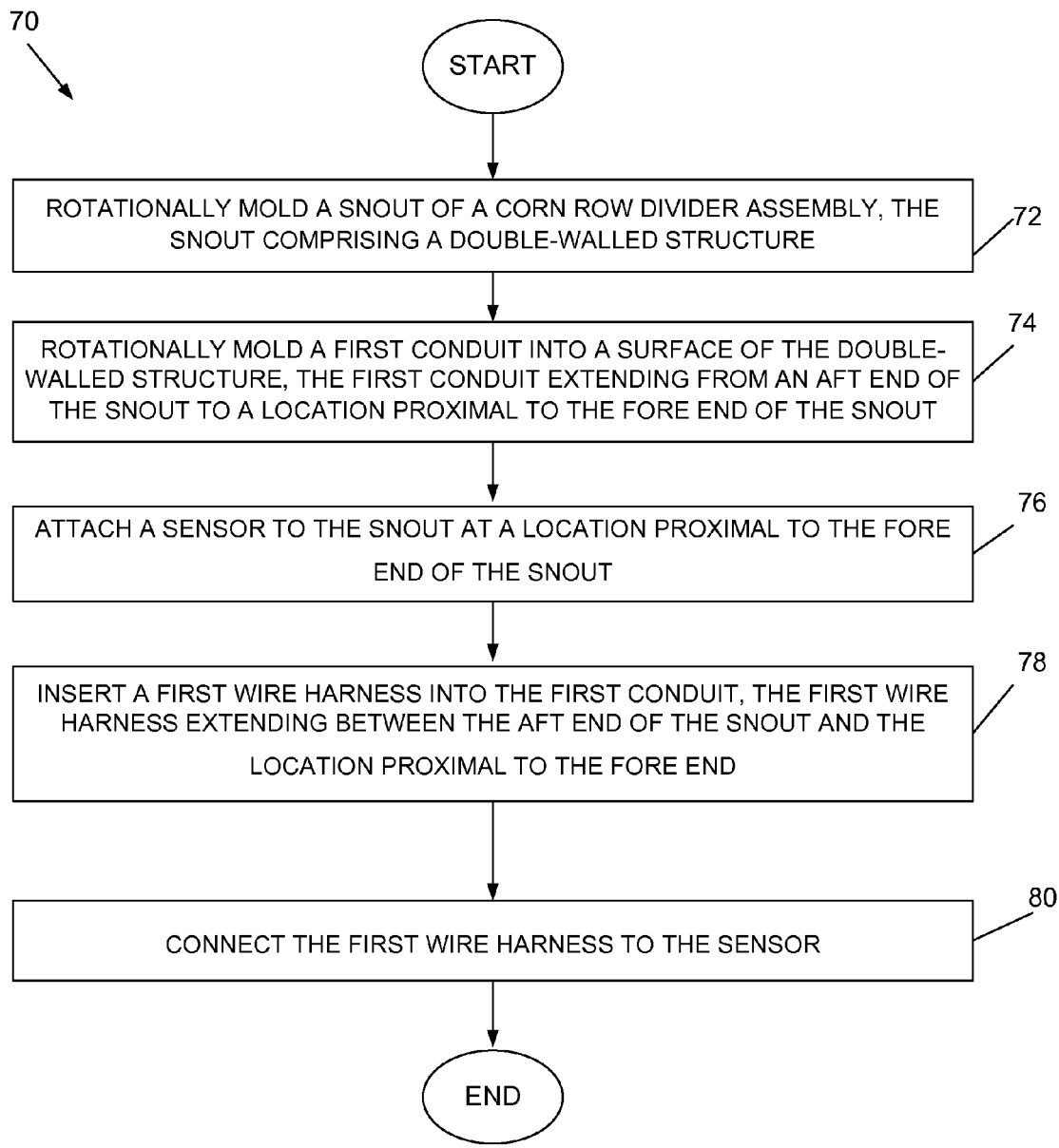
FIG. 7 is a flow diagram that illustrates an example embodiment of an integrated wire harness method.

Having described some example embodiments of an integrated wire harness assembly, it should be appreciated in view of the present disclosure that one embodiment of a an integrated wire harness method 70, depicted in FIG. 7, comprises rotationally molding a snout of a corn row divider assembly, the snout comprising a double-walled structure (72); rotationally molding a first conduit into a surface of the double-walled structure, the first conduit extending from an aft end of the snout to a location proximal to the fore end of the snout (74); attaching a sensor to the snout at a location proximal to the fore end of the snout (76); inserting a first wire harness into the first conduit, the first wire harness extending between the aft end of the snout and the location proximal to the fore end (78); and connecting the first wire harness to the sensor (80).

It should be appreciated by one having ordinary skill in the art that the above-described method may be executed out of order from that shown or discussed, including substantially concurrently or in reverse order, with fewer or more steps, depending on the functionality involved, as would be understood by those reasonably skilled in the art of the present disclosure.

It should be emphasized that the above-described embodiments of the present disclosure are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and protected by the following claims.

At least the following is claimed:

1. A corn header, comprising:
a frame;
a cross auger coupled to the frame;
a corn row divider assembly comprising a snout and gatherer hood hingeably coupled to, and aft of, the snout, the snout and gatherer hood each comprising a double wall having an interior surface, the interior surface comprising a conduit molded into the interior surface;
a sensor attached to the snout;
a first wire harness comprising a plurality of bundled wires electrically coupled to the sensor, wherein the first wire harness is disposed within the conduit molded into the snout.

2. The corn header of claim 1, further comprising a second wire harness disposed within the conduit of the gatherer hood, the second wire harness coupled to the first wire harness between the aft end of the snout and the fore end of the gatherer hood, the second wire harness further coupled to a control panel.

3. The corn header of claim 2, further comprising at least one connector at a coupling location between the first and second wire harness, the at least one connector detachably connecting the first and second wire harnesses.

4. The corn header of claim 2, wherein the wires of the first and second wire harness are the same wires.

5. The corn header of claim 2, further comprising at least one connector adjacent the aft end of the gatherer hood, wherein the second wire harness is detachably coupled to third wire harness that terminates at the control panel.

6. The corn header of claim 1, wherein the conduit is a rotationally molded structure.

7. A corn header, comprising:
a frame;
a cross auger coupled to the frame;
a corn row divider assembly comprising a snout and gatherer hood hingeably coupled to, and aft of, the snout, the snout and gatherer hood each comprising a double wall having an interior surface, the interior surface comprising a wire harness molded into the interior surface.

8. The corn header of claim 7, wherein the wire harness of the snout comprises a first wire harness molded into the interior surface of the snout, wherein one end of the first wire harness is electrically coupled to a sensor attached to the snout.

9. The corn header of claim 8, wherein another end of the first wire harness is detachably connected to a first connector.

10. The corn header of claim 7, wherein the wire harness of the gatherer hood comprises a second wire harness molded into the interior surface of the gatherer hood, wherein one end of the second wire harness is detachably connected to a second connector.

11. The corn header of claim 7, wherein the wire harness of the gatherer hood comprises a second wire harness molded into the interior surface of the gatherer hood, wherein opposing ends of the second wire harness are detachably connected to respective connectors.

12. The corn header of claim 7, further comprising a jumper wire coupled between the wire harness of the snout and the wire harness of the gatherer hood.

13. The corn header of claim 12, wherein the jumper wire comprises a connector on each end.

14. The corn header of claim 7, wherein the wire harness of the snout and the gatherer hood each comprises a plurality of bundled wires.

15. The corn header of claim 7, wherein the wire harness comprises an insert of a rotationally molded interior surface, the insert part of a rotationally molded process.

16. A method, comprising:
rotationally molding a snout of a corn row divider assembly, the snout comprising a double-walled structure;
rotationally molding a first conduit into a surface of the double-walled structure, the first conduit extending from an aft end of the snout to a location proximal to the fore end of the snout;
attaching a sensor to the snout at a location proximal to the fore end of the snout;
inserting a first wire harness into the first conduit, the first wire harness extending between the aft end of the snout and the location proximal to the fore end; and
connecting the first wire harness to the sensor.

17. The method of claim 16, further comprising:
rotationally molding a gatherer hood of the corn row divider assembly, the gatherer hood comprising a double-walled structure;
rotationally molding a second conduit into a surface of the double-walled structure of the gatherer hood, the second conduit extending from an aft end of the gatherer hood to a location proximal to the fore end of the gatherer hood;
inserting a second wire harness into the second conduit, the second wire harness extending between the aft end of the gatherer hood and the location proximal to the fore end; and
connecting the second wire harness to the first wire harness.

* * * * *